United States Patent
Kawamori et al.

(10) Patent No.: US 10,738,936 B2
(45) Date of Patent: Aug. 11, 2020

(54) FEEDING DEVICE

(71) Applicant: SUGINO MACHINE LIMITED, Uozu, Toyama Prefecture (JP)

(72) Inventors: Yoshiteru Kawamori, Uozu (JP); Toyoaki Mitsue, Uozu (JP)

(73) Assignee: SUGINO MACHINE LIMITED, Uozu (JP)

( * ) Notice: Subject to any disclaimer, the term of this patent is extended or adjusted under 35 U.S.C. 154(b) by 326 days.

(21) Appl. No.: 15/625,525

(22) Filed: Jun. 16, 2017

(65) Prior Publication Data
US 2018/0023753 A1 Jan. 25, 2018

(30) Foreign Application Priority Data

Jul. 22, 2016 (JP) .................................. 2016-144003

(51) Int. Cl.
*F16M 11/18* (2006.01)
*B25J 17/02* (2006.01)
(Continued)

(52) U.S. Cl.
CPC .............. *F16M 11/18* (2013.01); *B08B 3/02* (2013.01); *B08B 13/00* (2013.01);
(Continued)

(58) Field of Classification Search
CPC ........ F16M 11/18; F16M 11/123; B08B 3/02; B08B 13/00; B23Q 11/0042; B23Q 37/00;
(Continued)

(56) References Cited

U.S. PATENT DOCUMENTS

| 3,665,148 A * | 5/1972 | Yasenchak ........... B23K 11/318 |
| | | 219/124.4 |
| 5,036,724 A * | 8/1991 | Rosheim .................. B25J 9/103 |
| | | 74/490.06 |
| 8,960,042 B2 * | 2/2015 | Liu .......................... B25J 9/102 |
| | | 74/490.03 |
| 9,393,627 B2 * | 7/2016 | Hirasaka .................. B08B 1/00 |

(Continued)

FOREIGN PATENT DOCUMENTS

| JP | S51-149659 A | 12/1976 |
| JP | H01-150042 A | 6/1989 |

(Continued)

OTHER PUBLICATIONS

Dec. 17, 2017 Search Report issued in European Patent Application No. 17176885.6.

*Primary Examiner* — Orlando E Aviles
*Assistant Examiner* — Robert F Neibaur
(74) *Attorney, Agent, or Firm* — Oliff PLC

(57) ABSTRACT

A feeding device includes a feed base that is horizontally installed, a first driving source and a second driving source, a first saddle, a second saddle, a first propeller shaft, a second propeller shaft, a first transmission device, a second transmission device, and a holding device. The first saddle rotates about a first axis that goes along a vertical direction. The second saddle is disposed at the first saddle. The second saddle rotates about a second axis. The second axis goes along a horizontal direction. The first propeller shaft transmits a torque from the first driving source. The second propeller shaft transmits a torque from the second driving source. The first transmission device transmits a rotation of the first propeller shaft to the first saddle. The second transmission device transmits a rotation of the second propeller shaft to the second saddle. The holding device holds the object.

6 Claims, 9 Drawing Sheets

(51) Int. Cl.
  *B25J 21/00* (2006.01)
  *B08B 3/02* (2006.01)
  *B08B 13/00* (2006.01)
  *F16M 11/12* (2006.01)

(52) U.S. Cl.
  CPC ........... *B25J 17/0258* (2013.01); *B25J 21/00* (2013.01); *F16M 11/123* (2013.01)

(58) Field of Classification Search
  CPC ........ B25J 17/0258; B25J 21/00; B25J 17/00; B25J 17/02; B25J 11/00; F16H 1/12; F16H 1/14; F16H 48/08; F16C 11/06
  USPC .......................................... 269/71, 43, 45, 55
  See application file for complete search history.

(56) References Cited

U.S. PATENT DOCUMENTS

| | | | |
|---|---|---|---|
| 9,481,018 B2 * | 11/2016 | Mitsue | ...................... B08B 3/04 |
| 2005/0196263 A1 * | 9/2005 | Tamura | .................... B25J 9/023 |
| | | | 414/744.5 |
| 2010/0183394 A1 * | 7/2010 | Tatsuda | .................. B23Q 1/287 |
| | | | 409/183 |

FOREIGN PATENT DOCUMENTS

| | | |
|---|---|---|
| JP | H06-193663 A | 7/1994 |
| JP | 2577410 B2 * | 1/1997 |
| JP | H10-6269 A | 1/1998 |
| JP | 2016-022462 A | 2/2016 |
| KR | 2015-0032214 A | 3/2015 |

\* cited by examiner

FEEDING DEVICE

TECHNICAL FIELD

The present invention relates to a feeding device.

BACKGROUND ART

As a background art of this technical field, for example, Japanese Unexamined Patent Application Publication No. 2016-22462 discloses the following feeding device. The feeding device movably disposed through a cover device to face a work region shielded by the cover device, for holding an object, includes: a first rotary saddle that is rotatable about a first axis; a second rotary saddle disposed on the first rotary saddle and rotatable about a second axis perpendicular to the first axis; a holding device that holds the object; a first driving device disposed outward of the cover device with respect to the work region to rotate the first rotary saddle; and second driving device disposed outward of the cover device with respect to the work region to rotate the second rotary saddle (see ABSTRACT).

SUMMARY

The feeding device of the present invention includes a feed base, a first driving source and a second driving source, a first saddle, a second saddle, a first propeller shaft, a second propeller shaft, a first transmission device, a second transmission device, and a holding device. The feed base has a hollow structure and is installed horizontally. The first driving source and the second driving source are disposed at a base end portion of the feed base. The first saddle is disposed at a distal end portion of the feed base. The first saddle rotates about a first axis. The first axis goes along a vertical direction. The second saddle is disposed at the first saddle. The second saddle rotates about a second axis. The second axis goes along a horizontal direction. The first propeller shaft is disposed along a longitudinal direction of the feed base at an inside of the feed base. The first propeller shaft transmits a torque from the first driving source. The second propeller shaft is disposed along the longitudinal direction of the feed base at the inside of the feed base. The second propeller shaft transmits a torque from the second driving source. The first transmission device is disposed between the first propeller shaft and the first saddle. The first transmission device transmits a rotation of the first propeller shaft to the first saddle. The second transmission device is disposed between the second propeller shaft and the second saddle. The second transmission device transmits a rotation of the second propeller shaft to the second saddle. The holding device is disposed on the second saddle. The holding device holds the object.

The configurations other than those described above will be made apparent from the following embodiments.

DESCRIPTION OF EMBODIMENTS

Figure 1:
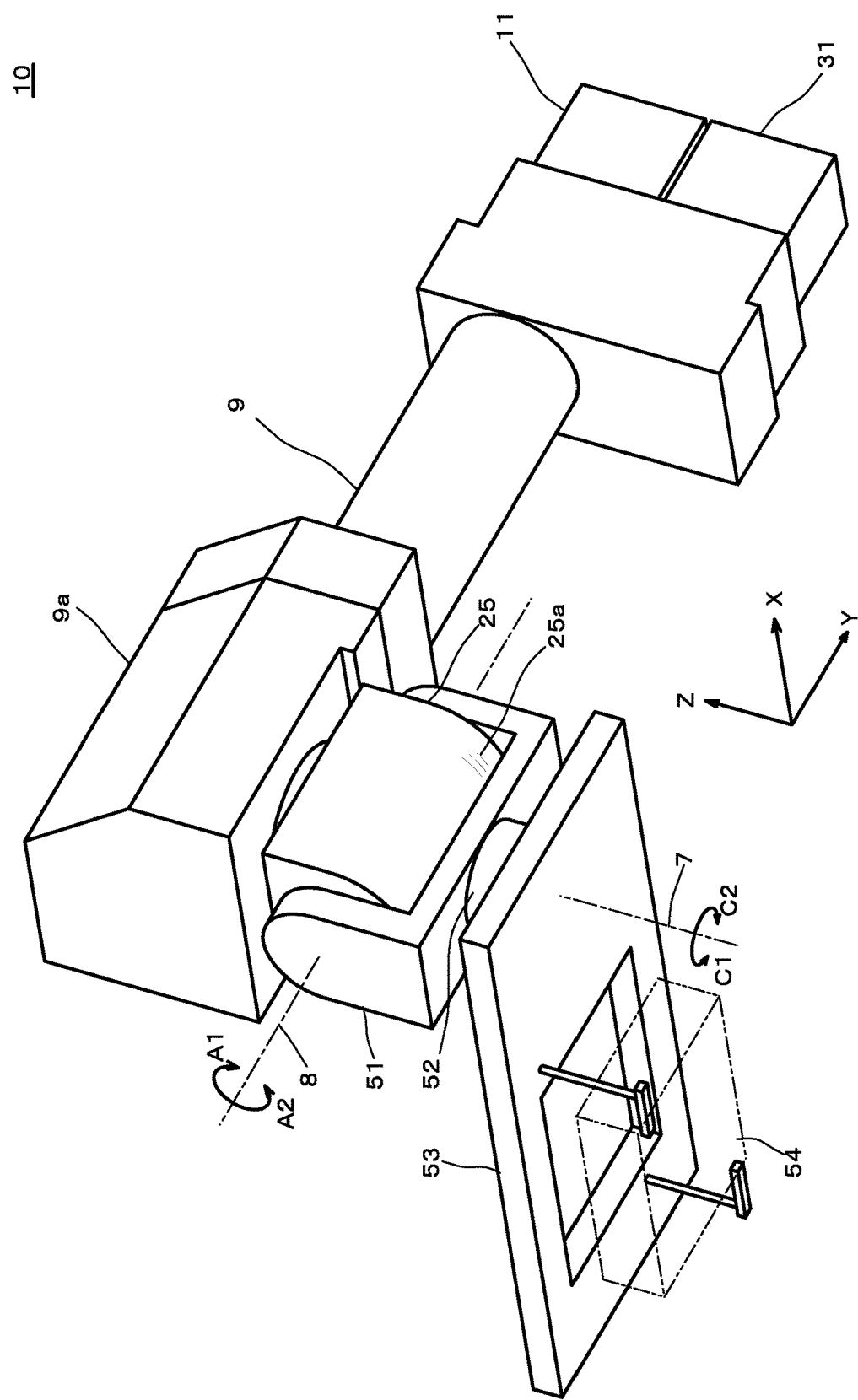
FIG. 1 is a perspective view of a feeding device according to an embodiment of the present invention.

The following describes embodiments of a feeding device according to the present invention with reference to the drawings. FIGS. 1 to 7 shows a feeding device 10 according to the embodiment.

The respective drawings define a right-left direction (horizontal transverse direction) viewed from a front surface side (a side opposed to a head 9a of a feed base 9) of a cleaning device to which the feeding device 10 is applied as an X-axis, a front-rear direction (horizontal depth direction) as a Y-axis, and an up-down direction (vertical direction) as a Z-axis. The respective drawings define rotation directions about a first axis 7 along the Z-axis direction as C1-C2 directions and rotation directions about a second axis 8 along the X-axis direction as A1-A2 directions. In accordance with these definitions, this specification appropriately designates a positive direction of the X-axis as "right," a negative direction of the X-axis as "left," a positive direction of the Y-axis as "rear" or "base end," a negative direction of the Y-axis as "front" or "distal end," a positive direction of the Z-axis as "top," and a negative direction of the Z-axis as "bottom." The second axis 8 faces the X-axis direction (horizontal transverse direction) in an initial state. However, for convenience of explanation, FIG. 1 to FIG. 4 illustrate a state of rotating a first saddle 25 about the first axis 7 by 90° from the initial state such that the second axis 8 faces the Y-axis direction.

The feeding device 10 is disposed so as to lie down on, for example, an orthogonal three-axis moving device of a cleaning device horizontally in a front-rear direction of the cleaning device. As illustrated in FIG. 1 or a similar drawing, the feeding device 10 includes the first saddle 25 on the distal end portion (front end portion). The first saddle 25 rotates about the first axis 7, which goes along the Z-axis direction (vertical direction). The first saddle 25 supports a second saddle 51 that rotates about the second axis 8, which goes along the X-axis direction (horizontal transverse direction). A hand (holding device) 53 is removably disposed on the second saddle 51.

The hollow, column-shaped feed base 9 extends in the Y-axis direction. The approximately prism head 9a is disposed on a distal end portion on a near-side of the feed base 9. A first driving device (first driving source) 11 and a second driving device (second driving source) 31 are disposed on a base end portion (rear end portion) on a depth side of the feed base 9. In addition to a servo motor, a cam device, a hydraulic cylinder, or a similar device is applicable as the first driving device 11 and the second driving device 31. For application as the cleaning device, the head 9a of the feed base 9 passes through a telescopic cover, a bellows, a roll-up cover, and another extension cover and is positioned in a cleaning region 71, and the first driving device 11 and the second driving device 31 are positioned at the rear of the extension cover. It is only necessary that the feed base 9 has a pillar shape of hollow structure. A transverse cross-sectional surface (a cross section parallel to a Z-X plane, the same applies to the following) of the feed base 9 is not limited to a circular shape but can freely have a shape such as a rectangular cross section and a diamond shape.

A second propeller shaft 35, which is a hollow shaft, is rotatably disposed at an inside of the feed base 9 with bearings 36 along a longitudinal direction (Y-axis direction) of the feed base 9. A first propeller shaft 13 is rotatably disposed at an inside of the second propeller shaft 35 with a bearing 14. The first propeller shaft 13 passes through the second propeller shaft 35. The second propeller shaft 35, and the first propeller shaft 13 are disposed so as to be coaxially with a center axis 6 of the feed base 9. Accordingly, the first propeller shaft 13 and the second propeller shaft 35 rotate about the center axis 6. The first propeller shaft 13 transmits a torque, a rotational speed, and an amount of rotation of the first driving device 11, and the second propeller shaft 35 transmits a torque, a rotational speed, and an amount of rotation of the second driving device 31 to a power conversion mechanism and a deceleration mechanism (both of which will be described later).

Since the two propeller shafts are coaxially disposed, the propeller shafts can be configured compactly and further can be manufactured at a low-price. The respective propeller shafts can be accurately assembled. This makes controls of a backlash and vibrations in a power transmission system easy. A positional relationship between the first propeller shaft 13 and the first driving device 11, and the second propeller shaft 35 and the second driving device 31 may be exchanged with one another. That is, it is only necessary that one of the first propeller shaft 13 and the second propeller shaft 35 passes through the other and both are disposed on the center axis 6.

Figure 4:
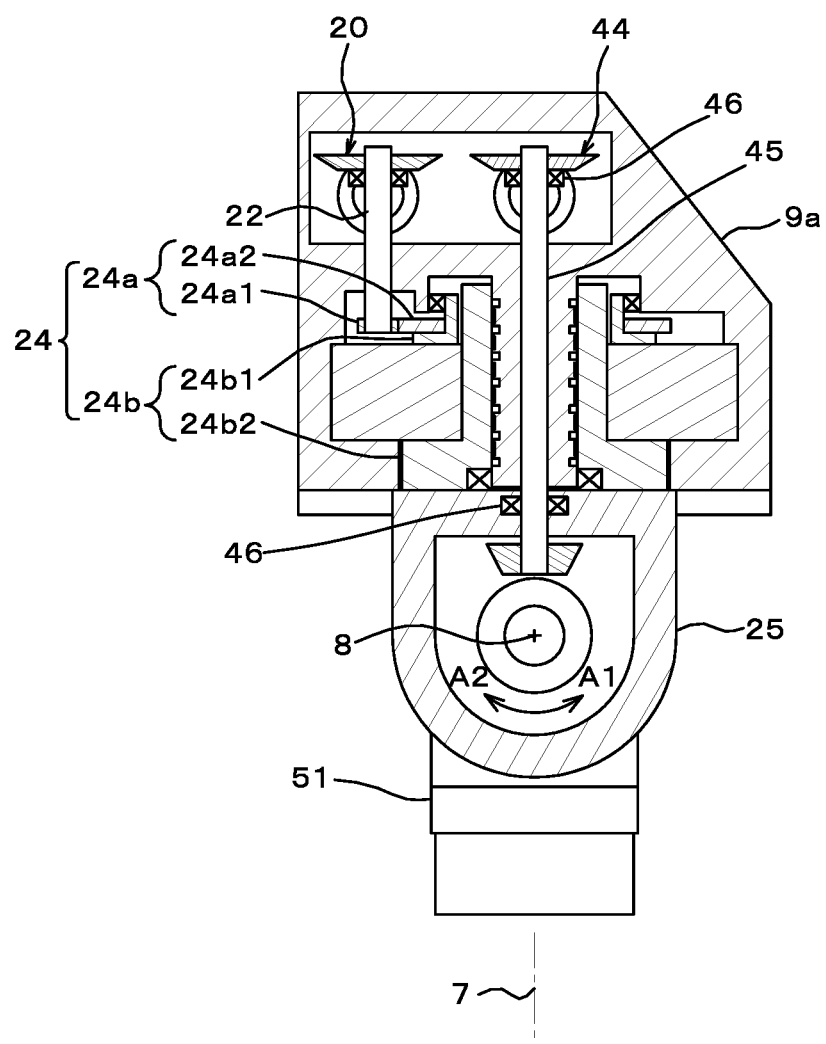
FIG. 4 is a cross-sectional view taken along a line IV-IV in FIG. 2.
Figure 5:
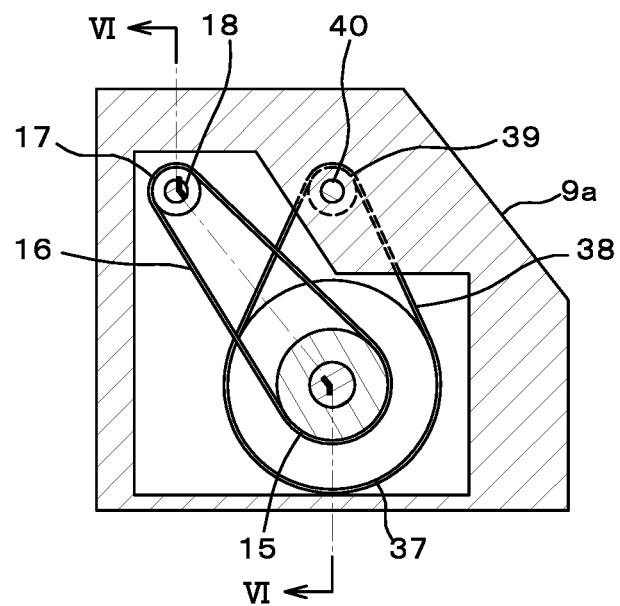
FIG. 5 is a cross-sectional view taken along a line V-V in FIG. 2.
Figure 6:
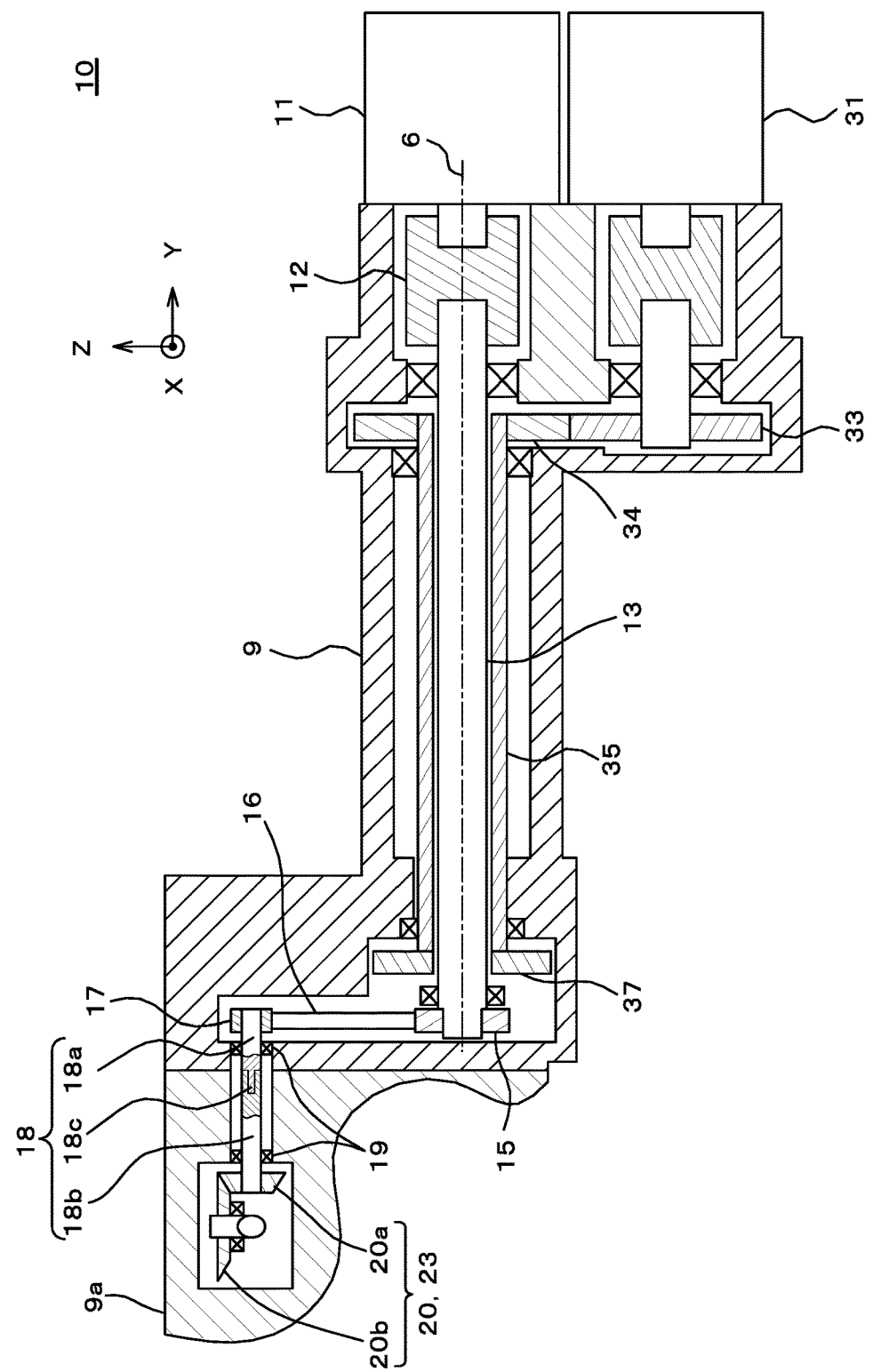
FIG. 6 is a cross-sectional view taken along a line VI-VI in FIG. 5.

The following describes an internal structure of the feed base 9 with reference to FIG. 4 to FIG. 6. As illustrated in FIG. 6, the first propeller shaft 13 and an output shaft of the first driving device 11 are coupled with a coupling 12. The coupling 12 is selected according to a type of the first driving device 11. With the use of the servo motor as the first driving device 11, a servo coupling is used as the coupling 12. A first toothed pulley 15 is disposed at a distal end portion of the first propeller shaft 13.

As illustrated in FIG. 5, a first offset shaft 18 is disposed at a position near an upper left side at the inside of the head 9a. As illustrated in FIG. 6, the first offset shaft 18 is disposed parallel to the first propeller shaft 13 and the second propeller shaft 35 and also is parallel to the feed base 9. The first offset shaft 18 is rotatably disposed by bearings 19. A second toothed pulley 17 is disposed at the rear of the first offset shaft 18. A first endless toothed belt 16 is stretched across the first toothed pulley 15 and the second toothed pulley 17.

As the first endless toothed belt 16 and a second endless toothed belt 38, which will be described later, for example, a belt with a core wire made of a fiber having expansibility lower than that of a piano wire, such as a polyamide fiber and a carbon fiber, is applicable. At this time, since circumferential stretches of the first endless toothed belt 16 and the second endless toothed belt 38 are small, a required tension can be applied without a tension pulley at a fixed distance between the axes. The tension pulley may be disposed instead of the above-described configuration. Instead of the first toothed pulley 15, the second toothed pulley 17, and the first endless toothed belt 16, a spur gear, a herringbone gear, a helical gear, or a sprocket and an endless chain are applicable. The use of a gear mechanism allows adjusting the backlash through an adjustment of the distance between the axes.

The head 9a is disposed separable from the feed base 9 in the longitudinal direction of the feed base 9. The first offset shaft 18 is dividable into a rear-side shaft 18a and a front-side shaft 18b, which are shaft members. The rear-side shaft 18a and the front-side shaft 18b are joined with a spline 18c. A spline shaft is disposed at the rear-side shaft 18a. The rear-side shaft 18a is rotatably disposed on the feed base 9 side. The front-side shaft 18b is rotatably disposed on the head 9a side. When joining the head 9a to the feed base 9, the spline shaft of the rear-side shaft 18a is inserted into a spline hole on the front-side shaft 18b so as to join the rear-side shaft 18a and the front-side shaft 18b together. This configuration allows the feed base 9 and the head 9a to be divided, ensuring making the assembly and decomposition easy. A length of the first offset shaft 18 can be adjusted with the spline 18c. This ensures the adjustment of the backlash between bevel gears 20a and 20b.

According to a design condition of the torque or the like, a serration may be used instead of the spline 18c. When the assembly and the decomposition need not to be taken into consideration, the first offset shaft 18 may be constituted of one inseparable shaft member.

A first power conversion mechanism 20 is disposed at a distal end of the first offset shaft 18. The first power conversion mechanism 20 converts a rotation of the first offset shaft 18 about the Y-axis into a rotation about the Z-axis, which is parallel to the first axis 7, and transmits a driving power of the first offset shaft 18 to a first intermediate shaft 22, which is coupled to the first power conversion mechanism 20. The first axis 7 is vertical to the longitudinal direction of the feed base 9. The first power conversion mechanism 20 is provided with the pair of bevel gears 20a and 20b meshing with one another. The power of the first power conversion mechanism 20 is transmitted to a first deceleration mechanism 24 via the first intermediate shaft 22. Accordingly, in broad meaning, this embodiment configures a first reduction gear with the first power conversion mechanism 20, the first intermediate shaft 22, and the first deceleration mechanism 24.

The first deceleration mechanism 24 is disposed at a center distal end portion inside the head 9a. A center of gravity G1 of the first deceleration mechanism 24 is disposed at a center portion of the feed base 9 (see FIG. 3). Here, the center portion means a site near a center of gravity G2 on a transverse cross-sectional surface of the columnar portion of the feed base 9. As illustrated in FIG. 4, the first deceleration mechanism 24 includes an input gear mechanism 24a, which is a first stage speed reduction gear, and a low backlash speed reduction gear 24b, which is a second stage speed reduction gear.

The input gear mechanism 24a is provided with a small gear 24a1 and a large gear 24a2. The small gear 24a1 is disposed at a lower end portion of the first intermediate shaft 22. The large gear 24a2 meshes with small gear 24a1 and is disposed on an input shaft 24b1 of the low backlash speed reduction gear 24b. The spur gear, the helical gear, and the herringbone gear are used for the small gear 24a1 and the large gear 24a2 of the input gear mechanism 24a.

The input gear mechanism 24a may employ a planetary gear mechanism in addition to the combination of the small gear 24a1 and the large gear 24a2. At this time, an input shaft can be configured as a sun gear and an output shaft can be configured as a planetary gear. An internal gear may be removed.

The low backlash speed reduction gear 24b is provided with a hollow first output shaft 24b2. The low backlash speed reduction gear 24b includes a speed reduction gear where the backlash is considerably small or 0. As the low backlash speed reduction gear 24b, a strain wave gearing mechanism, a roller gear cam deceleration mechanism, the planetary gear mechanism, a pin gear mechanism, or a similar mechanism is employed. The use of the low backlash speed reduction gear 24b as the second stage speed reduction gear can reduce the backlash to an amount in which the backlash accumulated between the first driving device 11 and the low backlash speed reduction gear 24b, which are coupled to one another, is divided by a reduction gear ratio of the low backlash speed reduction gear 24b. This allows a reduction in allowance of the first output shaft 24b2.

Instead of disposing the first power conversion mechanism 20, the first intermediate shaft 22, and the first deceleration mechanism 24, one low backlash speed reduction gear that has a hollow output shaft, and an input shaft and the output shaft are in a relationship of 90°-skew may be employed.

As the deceleration mechanism, instead of the above-described configuration, a deceleration mechanism where a screw gear mechanism, a worm gear mechanism, and other input shaft and output shaft are at skew positions can be used. The use of the deceleration mechanism with the input shaft and the output shaft disposed at the skew positions can simultaneously perform a direction conversion of the rotation direction and the deceleration. In this case as well, the deceleration mechanism is preferably the low backlash speed reduction gear.

The first saddle 25 is disposed at a distal end portion of the first output shaft 24b2. With reference to FIG. 1, the semi-cylindrical shaped first saddle 25 has a cylindrical surface 25a on the outer periphery. The cylindrical surface 25a uses the second axis 8 as the center axis. A part of the outer peripheral surface of the first saddle 25 is disposed above a lower end of the feed base 9, that is, disposed close to a center side of the feed base 9. The first saddle 25 can freely rotate in the C1-C2 directions. A rotation angle of the first saddle 25 is not physically limited. The first driving device 11 can index the rotation angle of the first saddle 25. A mechanical stopper or electronic means may restrict a rotation width (rotatable range) of the first saddle 25. An internal structure of the first saddle 25 will be described later.

Figure 2:
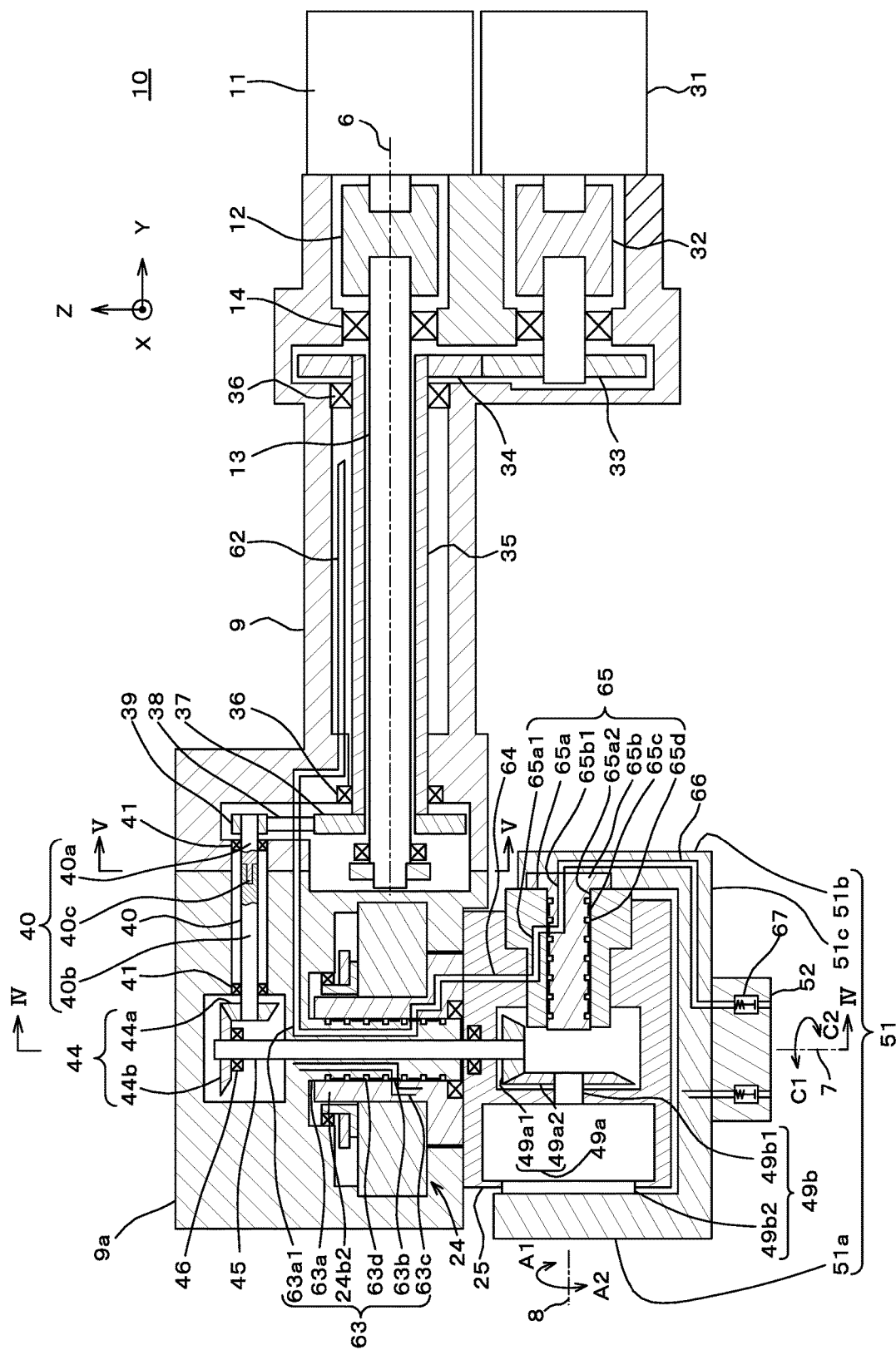
FIG. 2 is a vertical cross-sectional view of the feeding device according to the embodiment of the present invention.
Figure 3:
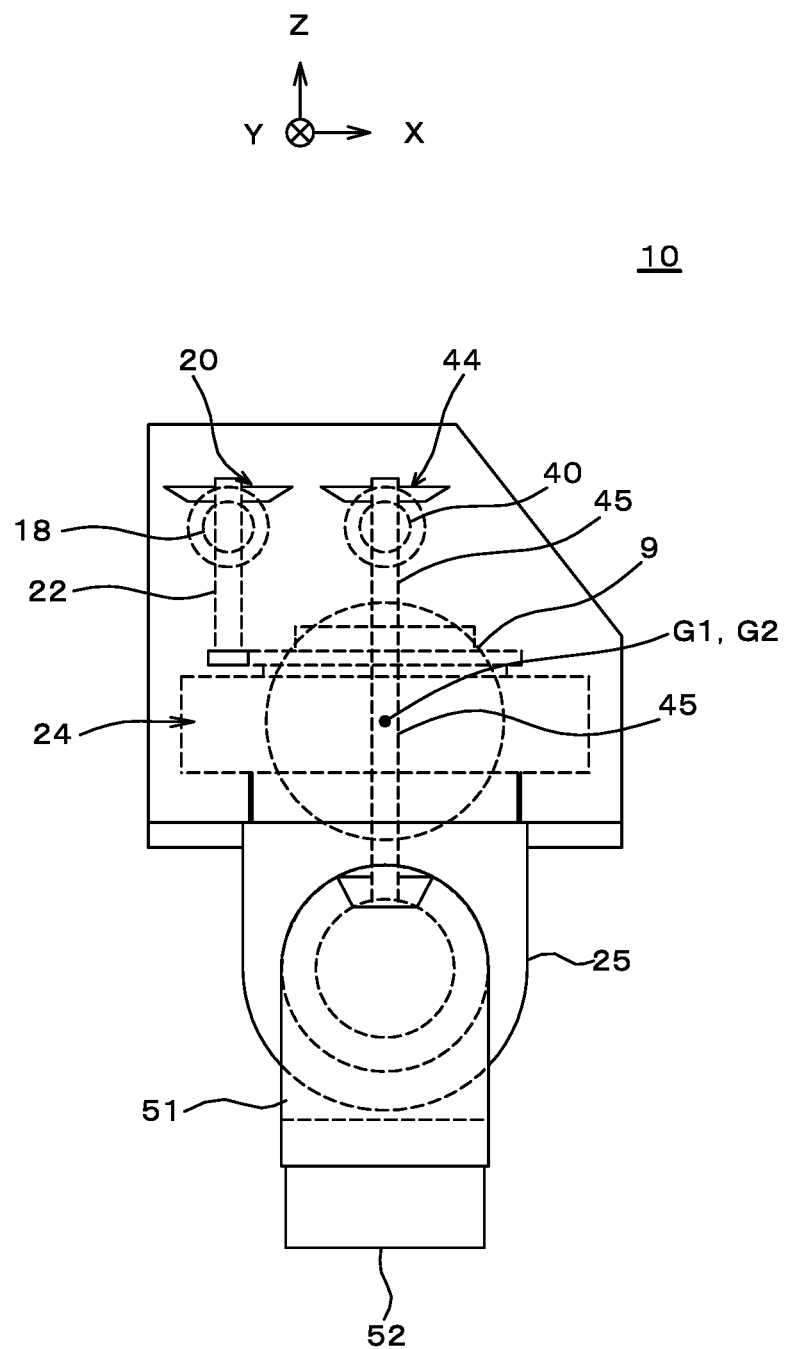
FIG. 3 is a front view of the feeding device according to the embodiment of the present invention.

With reference to FIG. 2, the second driving device 31 is disposed at a rear end portion of the feed base 9 arranged with the first driving device 11. A gear 33 is coupled to an output shaft of the second driving device 31 with a coupling 32. For example, the servo motor is used as the second driving device 31. At this time, the coupling 32 can use the servo coupling. A gear 34 that meshes with the gear 33 is disposed at a base end portion of the second propeller shaft 35. A third toothed pulley 37 is disposed at a distal end portion of the second propeller shaft 35.

With reference to FIG. 5 as well, a second offset shaft 40 is rotatably disposed by bearings 41 so as to be arranged with the first offset shaft 18 at an upper center portion of the head 9a. The second offset shaft 40 is disposed parallel to the feed base 9. A fourth toothed pulley 39 is disposed at a base end portion of the second offset shaft 40. The second endless toothed belt 38 is stretched across the third toothed pulley 37 and the fourth toothed pulley 39. Instead of the third toothed pulley 37, the fourth toothed pulley 39, and the second endless toothed belt 38, the spur gear, the herringbone gear, the helical gear, or the sprocket and the endless chain are applicable.

As apparent through a comparison between FIG. 2 and FIG. 6, the fourth toothed pulley 39, which is disposed at the base end portion of the second offset shaft 40, is positioned on the base end side in the Y-axis direction with respect to the second toothed pulley 17, which is disposed at the base end portion of the first offset shaft 18.

Here, the second offset shaft 40 may be disposed dividable into a rear-side shaft 40a and a front-side shaft 40b, which are the shaft members. At this time, the rear-side shaft 40a and the front-side shaft 40b are joined with a spline 40c. The serration may be used instead of the spline 40c. Obviously, the second offset shaft 40 can be constituted of the one shaft member. A detailed structure of the second offset shaft 40 is similar to the first offset shaft 18, and therefore the following omits the explanation.

Instead of dividing the head 9a, the first offset shaft 18, and the second offset shaft 40 in the longitudinal direction (front-rear direction) of the feed base 9, the head 9a may be divided in the Z-axis direction (up-down direction) so as to pass through the center axes of the first offset shaft 18 and the second offset shaft 40. At this time, it is only necessary to stretch the first endless toothed belt 16 and the second endless toothed belt 38 to install the first offset shaft 18 and the second offset shaft 40. This configuration also allows assembling the head 9a by the simple method.

The head 9a may be divided in the Z-axis direction at a position between the portion including the first offset shaft 18 and the second offset shaft 40 and the portion including the first propeller shaft 13 and second propeller shaft 35. At this time, a distance between two blocks configured by dividing the head 9a can be adjusted with a shim to ensure an adjustment of the tension of the first endless toothed belt 16 and the second endless toothed belt 38. Then, the use of the gear mechanism instead of the first endless toothed belt 16 and the second endless toothed belt 38 can adjust the backlash by the distance between the blocks.

A second power conversion mechanism 44 is disposed at a distal end portion of the second offset shaft 40. The second power conversion mechanism 44 is arranged with the first power conversion mechanism 20. The second power conversion mechanism 44 is provided with a pair of bevel gears 44a and 44b meshing with one another. The second power conversion mechanism 44 converts a driving power from the second propeller shaft 35 into the rotation about the first axis 7. The bevel gear 44a is disposed at a front end of the second offset shaft 40. The bevel gear 44b is disposed at an upper end of a second intermediate shaft 45.

FIG. 4 is a cross-sectional view taken along a line IV-IV in FIG. 2. With reference to FIG. 4, the second intermediate shaft 45 is disposed inside the head 9a arranged parallel to the first intermediate shaft 22. The second intermediate shaft 45 passes through a center of the first output shaft 24b2 such that a rotating axis of the second intermediate shaft 45 is disposed on the first axis 7. The second intermediate shaft 45 is rotatably supported by bearings 46 at both ends. The bearing 46 on the upper end side is disposed at the head 9a, and the bearing 46 on the lower end side is disposed at the first saddle 25. The rotation converted into the vertical direction (Z-axis direction) by the second power conversion mechanism 44 is transmitted to a third power conversion mechanism 49a, which will be described next, by the second intermediate shaft 45.

With reference to FIG. 2, the third power conversion mechanism 49a is disposed at a lower end portion of the second intermediate shaft 45. The third power conversion mechanism 49*a* is provided with a pair of bevel gears 49*a*1 and 49*a*2 meshing with one another. The third power conversion mechanism 49*a* converts a driving power from the second intermediate shaft 45, which rotates about the first axis 7, into the rotation about the second axis 8. Specifically, the bevel gear 49*a*1 is disposed at the lower end portion of the second intermediate shaft 45. The bevel gear 49*a*2, which meshes with the bevel gear 49*a*1, converts the rotation of the second intermediate shaft 45 into the direction about the second axis 8.

The bevel gears 49*a*1 and 49*a*2 are disposed inside the first saddle 25. The bevel gear 49*a*2 is secured to an input shaft 49*b*1 of a second deceleration mechanism 49*b*, which is similarly disposed inside the first saddle 25. Accordingly, in broad meaning, this embodiment configures a second reduction gear with the second power conversion mechanism 44, the second intermediate shaft 45, the third power conversion mechanism 49*a*, and the second deceleration mechanism 49*b*.

The above-described low backlash speed reduction gear is applicable to the second deceleration mechanism 49*b*. A reduction gear ratio of the second deceleration mechanism 49*b* is widely designed, for example, 1/20 to 1/70. Since the reduction gear ratio of the second deceleration mechanism 49*b* is large, inertias of a conveyed object 54 and the hand 53 can be increased. The use of the low backlash speed reduction gear as the second deceleration mechanism 49*b* reduces the backlash accumulated from the second driving device 31 to the input shaft 49*b*1 of the second deceleration mechanism 49*b* by the reduction gear ratio of the second deceleration mechanism 49*b*. This allows setting the allowance of the second saddle 51 small. The second saddle 51, which will be described later, is disposed at a second output shaft 49*b*2 of the second deceleration mechanism 49*b*. An auto-hand attaching and detaching device (holding device) 52 is disposed at the second saddle 51.

Instead of disposing the third power conversion mechanism 49*a* and the second deceleration mechanism 49*b*, one speed reduction gear where an input shaft and an output shaft are in a relationship of 90°-skew may be employed.

The second intermediate shaft 45 may be divided into two in the Z-axis direction. At this time, the shaft of the second intermediate shaft 45 on the head 9*a* side can be joined with the shaft on the first saddle 25 side together with a spline. This configuration allows the first saddle 25 to be easily separated from the first output shaft 24*b*2. Additionally, the first saddle 25 can be easily assembled. Furthermore, joining both divided shafts together with the spline allows the adjustment of the backlash in the third power conversion mechanism 49*a*.

The following describes the second saddle 51 with reference to FIG. 1 and FIG. 2. The second saddle 51 includes a plate-shaped first rotating member 51*a*, a plate-shaped second rotating member 51*b*, and a plate-shaped coupling body 51*c*. The first rotating member 51*a* is disposed at the second output shaft 49*b*2 and extends in a radial direction about the second axis 8 (in other words, the first rotating member 51*a* is disposed in a plane approximately perpendicular to the second axis 8). The second rotating member 51*b* is disposed at a rotator 65*b* of a rotary joint 65 and is opposed to the first rotating member 51*a* in the direction of the second axis 8. The coupling body 51*c* couples the first rotating member 51*a* to the second rotating member 51*b*. The second saddle 51 is formed into a U shape or a channel shape as a whole.

The second output shaft 49*b*2 and the rotator 65*b* support the second saddle 51 by both end portions of the second saddle 51 to rotatably support the second saddle 51. The second saddle 51 rotates along the cylindrical surface 25*a* of the first saddle 25. Accordingly, an outer surface of the first saddle 25 restricts a rotation range of the second saddle 51. That is, the second saddle 51 can rotate up to 90° from a position extending in the Z-axis direction in the A1 direction and the A2 direction. Devising the shapes of the first saddle 25 and the second saddle 51 allows changing the rotation range.

The auto-hand attaching and detaching device 52 is disposed radially outside (lower surface) of the coupling body 51*c* of the second saddle 51. Using a fluid such as compressed air, the auto-hand attaching and detaching device 52 attaches and removes the hand 53. When the auto-hand attaching and detaching device 52 sends the fluid to the hand 53, the hand 53 can hold or release the conveyed object (object) 54.

Figure 7:
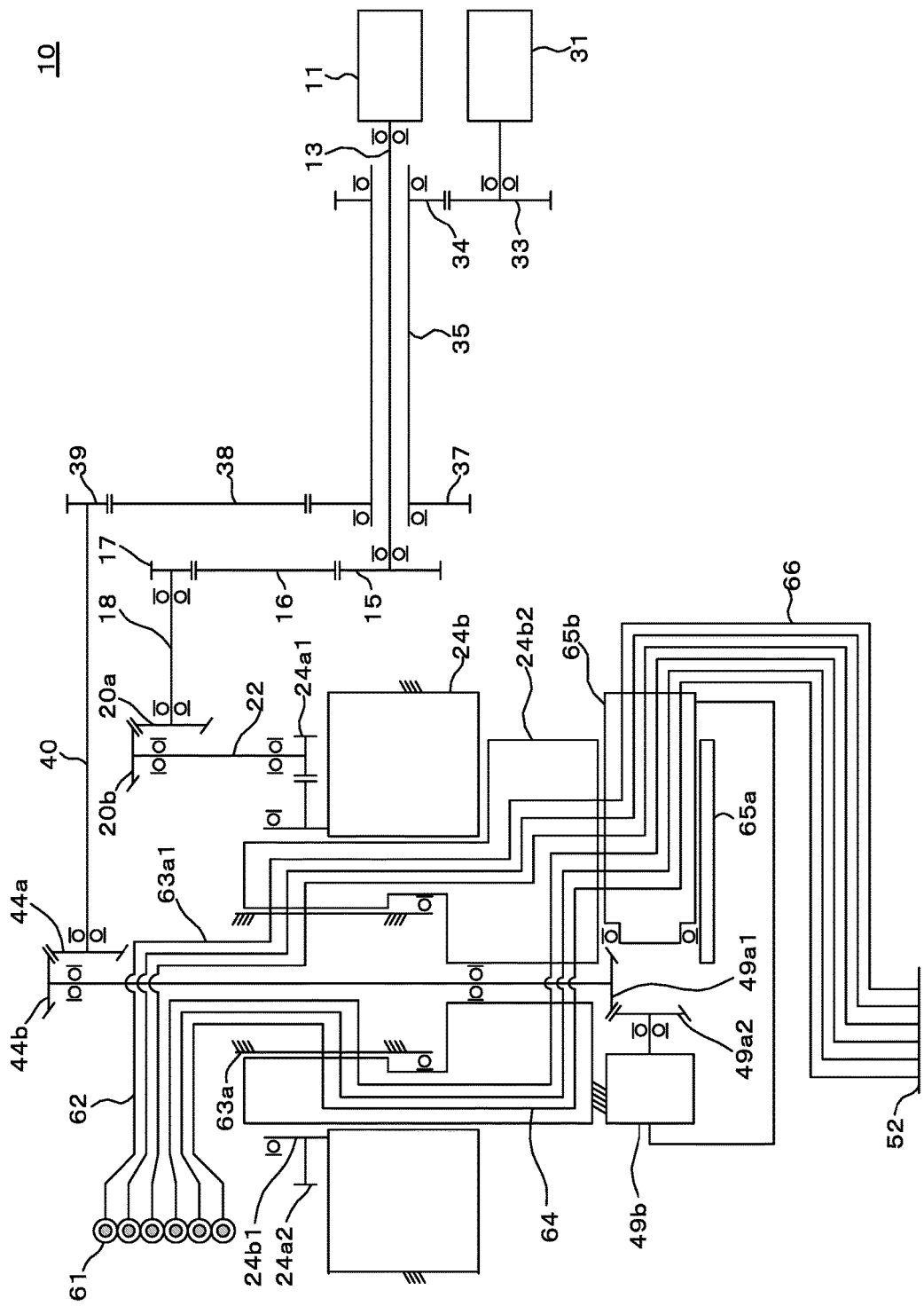
FIG. 7 is a schematic diagram illustrating power transmissions of the feeding device according to the embodiment of the present invention and passages for a fluid supplied to the feeding device.

The following describes a passage for the fluid supplied to the feeding device 10 with reference to FIG. 2 and FIG. 7. A pipe 62 coupled to a fluid supply source 61 passes through the inside of the feed base 9 and is coupled to the head 9*a*. The first output shaft 24*b*2 incorporates a rotary joint 63 that includes at least one passage. This embodiment includes the six passages. The first output shaft 24*b*2 serves as a rotation portion of the rotary joint 63. The first output shaft 24*b*2 internally includes a securing portion 63*a* of the rotary joint 63. The securing portion 63*a* has a hollow cylindrical shape. The securing portion 63*a* is secured to the inside of the head 9*a* and is unrotatable about the first axis 7. The first output shaft 24*b*2 is disposed so as to slide to an outer peripheral surface of the securing portion 63*a* in a circumferential direction. Further, the second intermediate shaft 45 is disposed inside the securing portion 63*a* so as to pass through.

A first ring passage 63*b* is disposed between the securing portion 63*a* and the first output shaft 24*b*2. The first ring passage 63*b* is disposed so as to circle the circumference. Specifically, the first ring passage 63*b* has a circumferential groove at any one or both of the securing portion 63*a* and the first output shaft 24*b*2. At an inside of the securing portion 63*a*, a first fluid passage 63*a*1 is disposed to communicate between the pipe 62 and the first ring passage 63*b*. At an inside of the first output shaft 24*b*2, a second fluid passage 63*c* is disposed. The second fluid passage 63*c* communicates with the first ring passage 63*b* and is open to a lower surface of the first output shaft 24*b*2. Packings 63*d* are disposed so as to interpose the first ring passage 63*b* therebetween and to seal a gap between the securing portion 63*a* and the first output shaft 24*b*2.

The first saddle 25 internally includes a third fluid passage 64 so as to couple the second fluid passage 63*c* to a passage of the rotary joint 65. The rotary joint 65 is disposed on a side opposite to the second deceleration mechanism 49*b* across the first axis 7 so as to rotate about the second axis 8. A securing body 65*a* of the rotary joint 65 has a hollow cylindrical shape and is secured on the second axis 8 of the first saddle 25. An inner surface of the securing body 65*a* is configured as a smoothly-finished cylindrical hole 65*a*2. The cylindrical hole 65*a*2 is disposed coaxially with the second axis 8. The rotator 65*b* of the rotary joint 65 has a solid cylindrical shape and is disposed at the cylindrical hole 65*a*2 to be slidable in the circumferential direction.

Second ring passages 65*c* are disposed between the securing body 65*a* and the rotator 65*b*. The second ring passage 65*c* is similar to the above-described first ring passage 63*b*. The securing body 65*a* includes a fluid passage 65*a*1 so as to communicate between the second ring passage 65*c* and the third fluid passage 64. The rotator 65*b* includes a fluid passage 65*b*1 that communicates with the second ring passage 65*c*. The fluid passage 65*b*1 is open to an end surface side close to the outside of the rotator 65*b*. Packings 65*d* are disposed so as to interpose the respective second ring passages 65*c* and seal a gap between the securing body 65*a* and the rotator 65*b*.

The second saddle 51 includes a fourth fluid passage 66 that communicates between the fluid passage 65*b*1 and the auto-hand attaching and detaching device 52. The fourth fluid passage 66 is disposed inside the second rotating member 51*b* and the coupling body 51*c*. A flat valve 67 is disposed at the fourth fluid passage 66. The flat valve 67 opens when the hand 53 is coupled to the auto-hand attaching and detaching device 52. When the flat valve 67 opens, the fluid is supplied from the fluid supply source 61 to the hand 53 via the auto-hand attaching and detaching device 52. The hand 53 holds the conveyed object 54 using the supplied fluid. The flat valve 67 closes when the auto-hand attaching and detaching device 52 detaches the hand 53.

The following describes actions and effects of the feeding device 10 according to the embodiment. With the feeding device 10 according to the embodiment, the first driving device 11 and the second driving device 31 are isolated from the head 9*a* (distal end portion) of the feed base 9 where the first saddle 25 and the second saddle 51 are disposed by the feed base 9. The second saddle 51, which rotates about the second axis 8 in the direction (Y-axis direction) different from the first axis 7, is disposed at the first saddle 25, which rotates about the first axis 7 in the direction (Z-axis direction) different from the longitudinal direction (Y-axis direction).

The torque of the first driving device 11 is transmitted to the first saddle 25 via the first propeller shaft 13, the first offset shaft 18, the first power conversion mechanism 20, the first intermediate shaft 22, and the first deceleration mechanism 24. The first saddle 25 rotates about the first axis 7 in the C1-C2 directions. Meanwhile, the torque of the second driving device 31 is transmitted to the second saddle 51 via the second propeller shaft 35, the second offset shaft 40, the second power conversion mechanism 44, the second intermediate shaft 45, the third power conversion mechanism 49*a*, and the second deceleration mechanism 49*b*. The second saddle 51 rotates about the second axis 8 in the A1-A2 directions.

To decelerate the rotations (driving powers) of the first driving device 11 and the second driving device 31 by the first deceleration mechanism 24 and the second deceleration mechanism 49*b*, the first driving device 11 and the second driving device 31 can rotate the hand 53 and the conveyed object 54, which have the inertias larger than the respective allowable inertias.

The feed base 9 incorporates the transmission mechanism such as the first propeller shaft 13, the second propeller shaft 35, the first power conversion mechanism 20, the second power conversion mechanism 44, the first intermediate shaft 22, and the second intermediate shaft 45. In view of this, to use the feeding device 10 as the conveying device for the cleaning machine as described above, the outer shape of the feeding device 10 isolates the driving device and the transmission mechanism from environment. Accordingly, this embodiment allows providing the considerably durable feeding device 10.

Since the rotation direction of the first driving device 11 and the rotation direction of the second driving device 31 are converted in the different directions by the first power conversion mechanism 20, the second power conversion mechanism 44, and the third power conversion mechanism 49*a*, which are the respective different power conversion mechanisms, the power conversion mechanism of the feeding device 10 can be structured simply.

An object of the present embodiment is to provide a feeding device that can maintain an object in the first posture and the second posture, which cannot be achieved by the conventional technique disclosed in Japanese Unexamined Patent Application Publication No. 2016-22462. The first posture means a state where, for example, a horizontally installed feeding device that horizontally holds an object (the state in FIG. 4 of Japanese Unexamined Patent Application Publication No. 2016-22462) rotates this object about a horizontal transverse axis viewed from a distal end side of the feeding device by a predetermined angle (for example, 90°). The second posture means a state of additionally rotating this object from the first posture about a vertical axis by a predetermined angle (for example, 180°). To achieve the above-described object, the present embodiment provides the feeding device 10 for controlling a posture of a held object.

In the feeding device 10 of the present embodiment, the second intermediate shaft 45 is disposed so as to pass through the inside of the first output shaft 24*b*2 in the first deceleration mechanism 24. Additionally, the third power conversion mechanism 49*a* and the second deceleration mechanism 49*b* are disposed inside the first saddle 25. This allows the first saddle 25 to rotate about the first axis 7 and allows the second saddle 51 to rotate about the second axis 8 with the simple structure. This configuration allows the conveyed object (object) 54, which is held in the horizontal posture by the auto-hand attaching and detaching device 52, to be maintained in the first posture, which is the state of rotating the conveyed object 54 about the second axis 8 as the horizontal transverse axis in the A1 direction or the A2 direction by the predetermined angle (90° at a maximum). Furthermore, this configuration allows the conveyed object 54 to be maintained in the second posture, which is the state of rotating the conveyed object 54 about the first axis 7 from this first posture in the C1 direction or the C2 direction by the predetermined angle (no restriction on the angle). The application of the feeding device 10 according to the embodiment to the cleaning device allows the conveyed object 54 to be changed to have the preferable posture in the cleaning region. This ensures shortening the cleaning period and therefore achieves efficient cleaning work.

Figure 8:
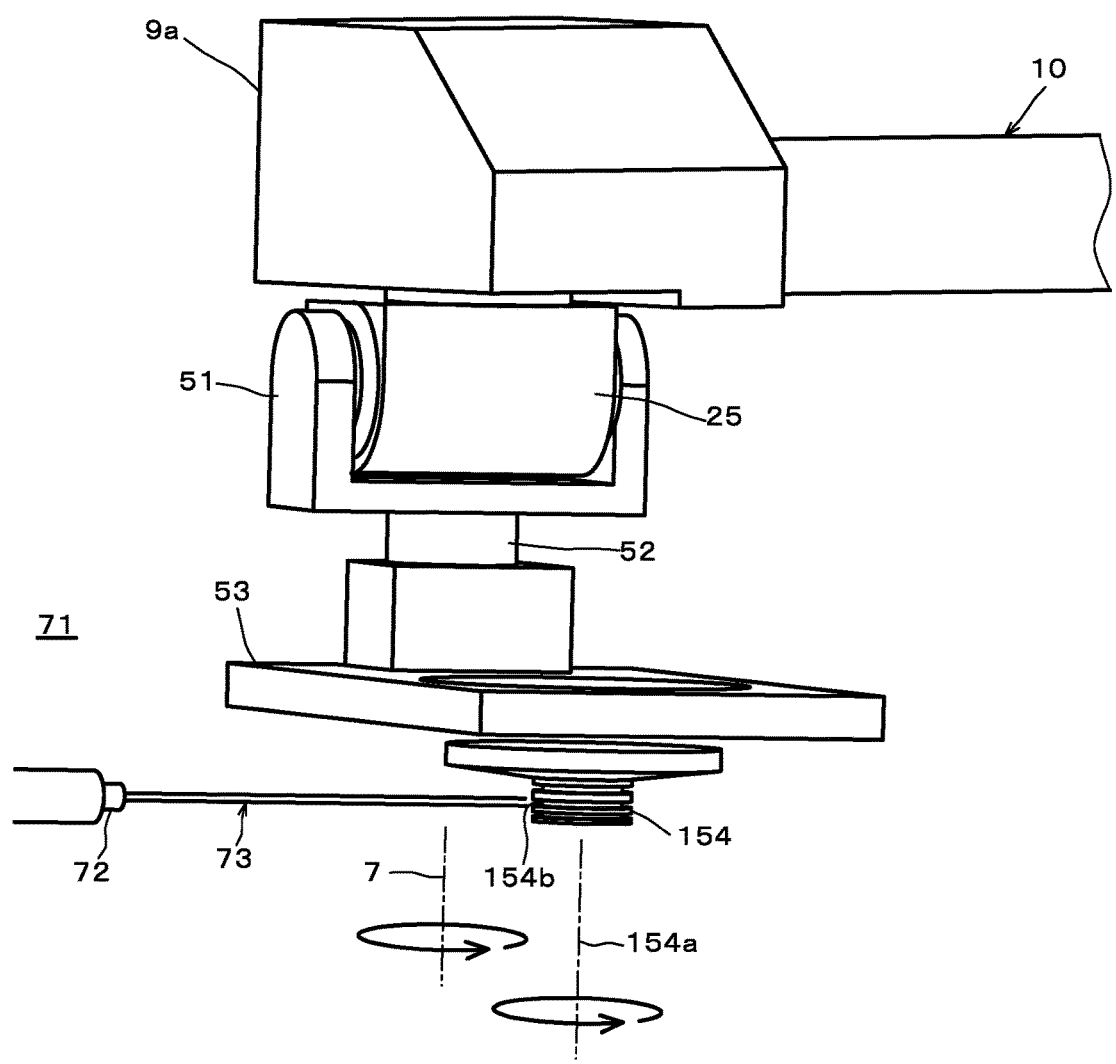
FIG. 8 is a drawing illustrating a concrete example of an application of the feeding device according to the embodiment of the present invention to a cleaning device.

The following specifically describes a cleaning method for the conveyed object. The following describes the method for cleaning an oil pump body 154 for automobile engine as one example of the conveyed object with reference to FIG. 8. As illustrated in FIG. 8, usually, a nozzle 72 is disposed inside the cleaning region 71 in the horizontal direction to avoid a jet 73 to scatter. The nozzle 72 spouts the jet 73 of a cleaning fluid. The feeding device 10 carries the oil pump body 154 into the cleaning region 71. While holding the oil pump body 154, the feeding device 10 causes the oil pump body 154 to be opposed to the nozzle 72. While changing a posture and a position of the oil pump body 154, the feeding device 10 causes the jet 73 to collide against a place to be cleaned (for example, a ring groove 154*b*) on the oil pump body 154.

The hand 53 holds the oil pump body 154 such that a center axis 154*a* of the oil pump body 154 faces the Z-axis direction (up-down direction). While drawing a circle about the center axis 154*a* at a rotational speed "n", the head 9*a* of the feeding device 10 causes the first saddle 25 to rotate about the first axis 7 at the identical rotational speed "n". Then, the oil pump body 154 rotates about the center axis 154a at the rotational speed "n". Causing the jet 73 to collide with the ring groove 154b with this state allows cleaning a whole circumference of the ring groove 154b. In this manner, the feeding device 10 is especially preferable as the cleaning device that cleans the rotator like the oil pump body 154, which has the ring groove.

Figure 9A:
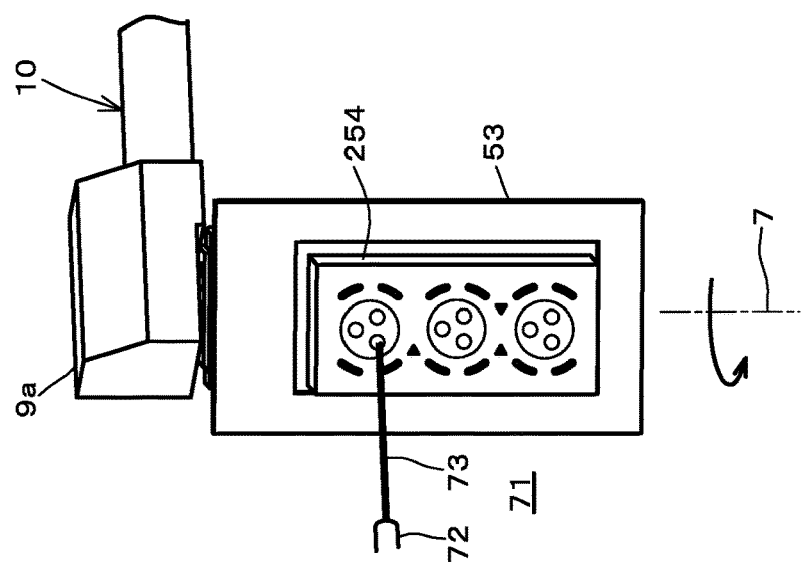
FIG. 9A to FIG. 9C are drawings illustrating a concrete example of an application of the feeding device according to the embodiment of the present invention to a cleaning device.
Figure 9B:
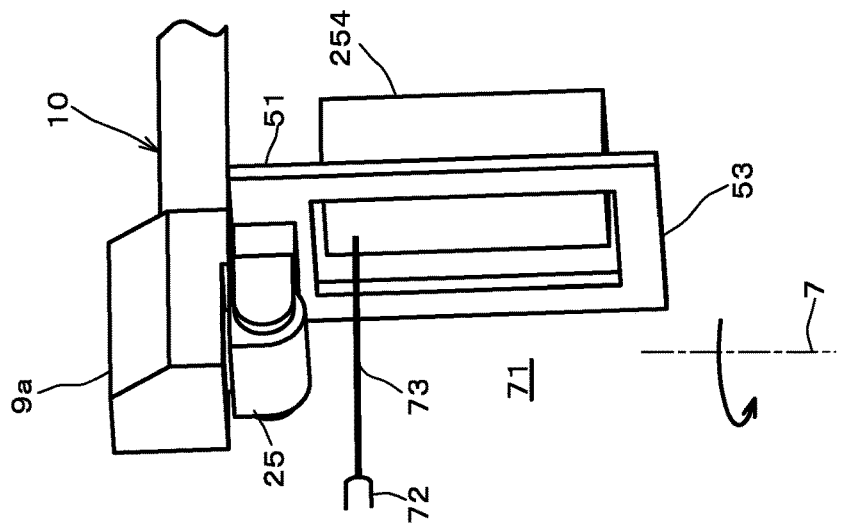
Figure 9C:
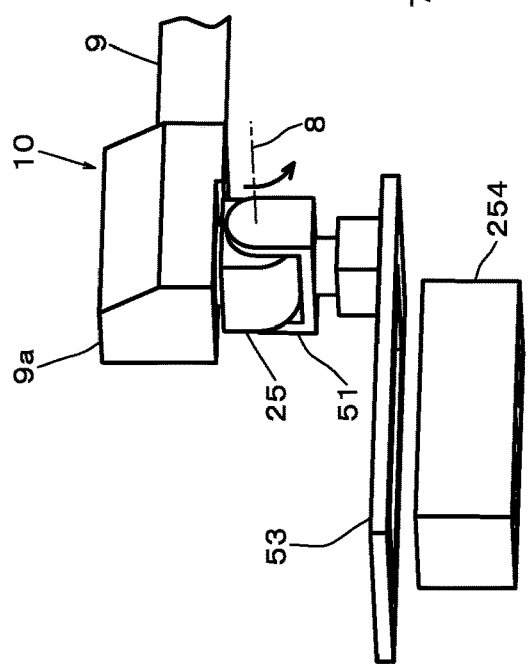

The following describes a method of cleaning a cylinder head 254 of an engine as one example of the conveyed object with reference to FIG. 9A to FIG. 9C. The hand 53 holds the cylinder head 254 with a longitudinal direction of the cylinder head 254 extending in the Y-axis direction (front-rear direction) (FIG. 9A). The second saddle 51 is caused to rotate about the second axis 8 by 90°. Then, the cylinder head 254 changes the posture such that the longitudinal direction goes along the Z-axis direction. The feeding device 10 carries the cylinder head 254 in this posture in the cleaning region 71 (FIG. 9B). The cylinder head 254 has many threads, lubrication holes, and water holes on a cylinder block mating surface, a cam housing mating surface, an intake surface, and an exhaust surface. The feeding device 10 can rotate the cylinder head 254 carried in the cleaning region 71 about the first axis 7 (FIG. 9C).

An exhaust manifold mounting surface often inclines with respect to the cylinder block mating surface. Since the feeding device 10 can rotate the cylinder head 254 about the longitudinal direction (Z-axis), an angle of the intake surface can be vertically indexed with respect to the nozzle 72. In this manner, the feeding device 10 is also preferable as the cleaning device that cleans the conveyed object extending long in one direction, such as a crankshaft, a camshaft, and a head cylinder.

While the case of the application of the feeding device 10 to the cleaning device is described above, needless to say, the feeding device 10 has the similar advantages when applied to a running robot or a painting machine, and jet working machine, such as a water jet peening device.

Since the second offset shaft 40 is disposed at the position above (the positive direction of the Z-axis) the first propeller shaft 13 and the second propeller shaft 35 in the head 9a of the feed base 9, the second intermediate shaft 45 can pass through the center portion of the head 9a of the feed base 9. Furthermore, the first offset shaft 18 is arranged with the second offset shaft 40. Accordingly, when the feeding device 10 is viewed from the front side, the first deceleration mechanism 24 can be disposed at the center portion of the feed base 9, thereby ensuring configuring the head 9a of the feed base 9 compactly and simple.

The first propeller shaft 13 and the first offset shaft 18 are coupled with the first endless toothed belt 16. Therefore, the backlash does not occur in the power transmission between the first propeller shaft 13 and the first offset shaft 18. The second propeller shaft 35 and the second offset shaft 40 are coupled with the second endless toothed belt 38. Therefore, the backlash does not similarly occur in the power transmission between the second propeller shaft 35 and the second offset shaft 40 as well.

Since this embodiment transmits the power via the plurality of gear mechanisms, the backlash is likely to be accumulated. However, interposing the first endless toothed belt 16 and the second endless toothed belt 38 reduces the backlash, leading to accurate index of the angle of the conveyed object 54.

Since the longitudinal direction of the feed base 9 and the first axis 7 and the second axis 8 are configured perpendicular to one another, this facilitates the control of the posture of the conveyed object 54 conveyed by the feed base 9.

Since the first output shaft 24b2 internally embeds the rotary joint 63, the feeding device 10 can be configured to be considerably compact. Furthermore, the first fluid passage 63a1 and the second fluid passage 63c passing through the rotary joint 63 can be disposed inside the first output shaft 24b2. Accordingly, the passage for the fluid can be embedded as the internal structure of the head 9a. Therefore, even if the head 9a is exposed under a severe external environment, the passage for the fluid is less likely to be damaged.

The first saddle 25 has a cylindrical surface 25a at the lower portion of the first saddle 25, and the second saddle 51 has the channel shape or the U shape. Therefore, when the second saddle 51 rotates about the second axis 8 with respect to the first saddle 25, the second saddle 51 does not interference with the first saddle 25 and is smoothly rotatable. Since the lower portion of the first saddle 25 is configured as the cylindrical surface 25a, this ensures sufficiently providing a space to install the respective components at the internal space of the first saddle 25.

Both ends of the second saddle 51 are secured by the second output shaft 49b2 of the second deceleration mechanism 49b and the rotator 65b of the rotary joint 65. Since both ends of the second saddle 51 are supported rotatably, the second saddle 51 is accurately rotatable along the second axis 8. Accordingly, the feeding device 10 can accurately index the position of the hand 53.

The first deceleration mechanism 24 is disposed at the center distal end portion inside the head 9a. The center of gravity G1 of the first deceleration mechanism 24 is disposed at the center portion of the feed base 9. A part of the outer peripheral surface of the first saddle 25 is disposed above the lower end of the feed base 9, that is, disposed close to the center side of the feed base 9. Regions at the rear of the first saddle 25 and the upper side of the holding device left as a dead space. The feeding device 10 configured as described above has the small dead space. Since the dead space at the lower side of the feed base 9 is small, when the feeding device 10 is embedded into the conveying device, the cleaning device, and other devices, the compact feeding device 10 can be provided.

A "first transmission device" of the present invention according to the above-described embodiment includes the first toothed pulley 15, the first endless toothed belt 16, the second toothed pulley 17, the first offset shaft 18, the first power conversion mechanism 20, the first intermediate shaft 22, and the first deceleration mechanism 24. A "second transmission device" of the present invention according to the above-described embodiment includes the third toothed pulley 37, the second endless toothed belt 38, the fourth toothed pulley 39, the second offset shaft 40, the second power conversion mechanism 44, the second intermediate shaft 45, the third power conversion mechanism 49a, and the second deceleration mechanism 49b.

The present invention is not limited to the above-described embodiments and various configurations are possible without departing from the gist of the present invention. All the technical matter included in the technical ideas described in the claims is subjected to the present invention. For example, two propeller shafts may be arranged parallel at the inside of the feed base 9 without the first offset shaft 18 and the second offset shaft 40, and two power conversion mechanisms may be disposed at distal end portions of the two propeller shafts. While the above-described embodiments show preferred examples, a person skilled in the art should be able to achieve various alternative examples, corrected examples, modification examples, or improved examples from the content of this disclosure, which are included in a technical range described in the claims attached.

What is claimed is:

1. A feeding device for controlling a posture of a held object, the feeding device comprising:
   a feed base having a hollow structure, the feed base being horizontally installed;
   a first driving source and a second driving source disposed at a base end portion of the feed base;
   a first saddle disposed at a distal end portion of the feed base, the first saddle rotating about a first axis, the first axis going along a vertical direction;
   a second saddle disposed at the first saddle, the second saddle rotating about a second axis, the second axis going along a horizontal direction;
   a first propeller shaft disposed along a longitudinal direction of the feed base at an inside of the feed base, the first propeller shaft transmitting a torque from the first driving source;
   a second propeller shaft disposed along the longitudinal direction of the feed base at the inside of the feed base, the second propeller shaft transmitting a torque from the second driving source;
   a first transmission device disposed between the first propeller shaft and the first saddle, the first transmission device transmitting a rotation of the first propeller shaft to the first saddle, wherein the first transmission device includes:
      a first power conversion mechanism configured to convert a power from the rotation of the first propeller shaft into a rotation about the first axis and transmit the power,
      a first intermediate shaft coupled to the first power conversion mechanism to rotate,
      a first deceleration mechanism configured to decelerate the rotation of the first intermediate shaft, the first deceleration mechanism including a hollow first output shaft, the first output shaft outputting a power transmitted from the first power conversion mechanism via the first intermediate shaft,
      the first saddle is coupled to the first output shaft to rotate about the first axis, and
      a first offset shaft, the first offset shaft being coupled to the first propeller shaft and the first power conversion mechanism to rotate;
   a second transmission device disposed between the second propeller shaft and the second saddle, the second transmission device transmitting a rotation of the second propeller shaft to the second saddle;
   a holding device disposed on the second saddle, the holding device holding the object;
   a securing portion having a hollow cylindrical shape, the securing portion being disposed at the inside of the first output shaft unrotatablely about the first axis;
   a first ring passage disposed between the first output shaft and the securing portion so as to circle in a circumferential direction of the securing portion;
   a first fluid passage disposed in the securing portion, the first fluid passage communicating between a fluid supply source and the first ring passage, the fluid supply source supplying the holding device with a fluid; and
   a second fluid passage disposed at the inside of the first output shaft, the second fluid passage communicating between the first ring passage and an outlet disposed on an outer surface of the first output shaft; wherein
   the first output shaft slides with respect to an outer peripheral surface of the securing portion in a circumferential direction;
   the second transmission device includes:
      a second power conversion mechanism configured to convert a power from the rotation of the second propeller shaft into the rotation about the first axis and transmit the power;
      a second intermediate shaft coupled to the second power conversion mechanism to rotate, the second intermediate shaft passing through an inside of the first output shaft;
      a third power conversion mechanism configured to convert a power from the rotation of the second intermediate shaft into a rotation about the second axis and transmit the power;
      a second deceleration mechanism coupled to the third power conversion mechanism, the second deceleration mechanism being configured to decelerate the rotation of the second intermediate shaft, the second deceleration mechanism including a second output shaft, the second output shaft outputting a power transmitted from the third power conversion mechanism; and
      a second offset shaft, the second offset shaft being coupled to the second propeller shaft and the second power conversion mechanism to rotate;
   the third power conversion mechanism and the second deceleration mechanism are mounted to an inside of the first saddle;
   the second saddle is coupled to the second output shaft to rotate about the second axis;
   the second offset shaft is disposed at the distal end portion of the feed base, the second offset shaft being disposed parallel to the longitudinal direction of the feed base from a position of the second propeller shaft along the first axis to a position opposite to a side where the first saddle is disposed viewed from the longitudinal direction of the feed base; and
   the first offset shaft is disposed at the distal end portion of the feed base, the first offset shaft being arranged with the second offset shaft parallel to the longitudinal direction of the feed base.

2. The feeding device according to claim 1, wherein each of the first offset shaft and the second offset shaft has two shaft members divided in axial directions.

3. The feeding device according to claim 1,
   wherein the first propeller shaft is a hollow shaft, and
   the second propeller shaft is coaxially with and passes through the first propeller shaft.

4. The feeding device according to claim 1, further comprising:
   a first toothed pulley disposed at a distal end portion of the first propeller shaft;
   a second toothed pulley disposed at a base end portion of the first offset shaft;
   a first endless toothed belt suspended between the first toothed pulley and the second toothed pulley;
   a third toothed pulley disposed at a distal end portion of the second propeller shaft;
   a fourth toothed pulley disposed at a base end portion of the second offset shaft; and
   a second endless toothed belt suspended between the third toothed pulley and the fourth toothed pulley.

5. The feeding device according to claim 1, further comprising:
- a rotary joint disposed at a position opposite to the second deceleration mechanism across the first axis of the first saddle, the rotary joint having:
  - a securing body with a cylindrical hole disposed coaxially with the second axis,
  - a rotator mounted to an inside of the cylindrical hole, the rotator rotating about the second axis; and
  - a second ring passage, the second ring passage being disposed between the cylindrical hole and the rotator so as to circle in a circumferential direction of the rotator,
- wherein the first saddle includes a third fluid passage, the third fluid passage communicating between the second ring passage and the second fluid passage,
- the second saddle includes a fourth fluid passage, the fourth fluid passage communicating between the second ring passage and a fluid outlet, the fluid outlet being disposed on an outer surface of the second saddle, and
- the second saddle includes a first rotating member, a second rotating member, and a coupling body, the first rotating member being disposed at the second output shaft and extending in a radial direction, the second rotating member being disposed at the rotator of the rotary joint parallel to the first rotating member, the coupling body coupling the first rotating member to the second rotating member.

6. The feeding device according to claim 1,
wherein the second propeller shaft is a hollow shaft, and
the first propeller shaft is coaxially with and passes through the second propeller shaft.

* * * * *